(12) United States Patent
Sawada

(10) Patent No.: US 8,845,019 B2
(45) Date of Patent: Sep. 30, 2014

(54) FOLDING TYPE SEAT

(75) Inventor: Tamotsu Sawada, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 205 days.

(21) Appl. No.: 12/996,198

(22) PCT Filed: Mar. 27, 2009

(86) PCT No.: PCT/JP2009/056278
§ 371 (c)(1),
(2), (4) Date: Dec. 3, 2010

(87) PCT Pub. No.: WO2009/147892
PCT Pub. Date: Dec. 10, 2009

(65) Prior Publication Data
US 2011/0074189 A1    Mar. 31, 2011

(30) Foreign Application Priority Data

Jun. 6, 2008 (JP) ................ 2008-149335

(51) Int. Cl.
*B60N 2/68* (2006.01)
*B60N 2/30* (2006.01)
*B60N 2/427* (2006.01)
*B60N 2/42* (2006.01)
*B60N 2/20* (2006.01)

(52) U.S. Cl.
CPC .............. *B60N 2/3011* (2013.01); *B60N 2/305* (2013.01); *B60N 2/42709* (2013.01); *B60N 2/4214* (2013.01); *B60N 2/20* (2013.01)
USPC ..................................... 297/216.1

(58) Field of Classification Search
USPC .................. 297/216.13, 216.1, 378.12, 316.1
See application file for complete search history.

(56) References Cited

U.S. PATENT DOCUMENTS

| | | | | |
|---|---|---|---|---|
| 4,861,103 A | * | 8/1989 | Vallee | 297/216.2 |
| 5,303,983 A | * | 4/1994 | Gauger et al. | 297/472 |
| 5,700,058 A | * | 12/1997 | Balagurumurthy et al. | 297/440.15 |
| 6,244,656 B1 | * | 6/2001 | Mueller | 297/216.13 |
| 6,491,346 B1 | * | 12/2002 | Gupta et al. | 297/452.65 |
| 6,543,855 B2 | * | 4/2003 | Bruck | 297/440.21 |
| 6,554,356 B1 | * | 4/2003 | Crose | 297/216.13 |
| 7,083,230 B2 | * | 8/2006 | Kull et al. | 297/216.1 |
| 7,360,832 B2 | * | 4/2008 | Yokota et al. | 297/216.16 |
| 8,052,195 B2 | * | 11/2011 | Aufrere et al. | 296/68.1 |
| 8,132,862 B2 | * | 3/2012 | Yamada et al. | 297/452.2 |
| 8,210,606 B2 | * | 7/2012 | Meghira et al. | 297/216.1 |
| 2005/0140190 A1 | | 6/2005 | Kawashima | |
| 2007/0262630 A1 | * | 11/2007 | Sawada et al. | 297/378.12 |

FOREIGN PATENT DOCUMENTS

| | | | |
|---|---|---|---|
| CN | 1640714 A | | 7/2005 |
| FR | WO2008017794 | * | 2/2008 |
| JP | 56-38664 | | 4/1981 |
| JP | 4-69222 U | | 6/1992 |

(Continued)

*Primary Examiner* — David R Dunn
*Assistant Examiner* — Timothy J Brindley
(74) *Attorney, Agent, or Firm* — Foley & Lardner LLP

(57) ABSTRACT

A folding type seat of the present invention includes a body section supporting bracket, supporting a body section of a reclining mechanism, and a passive section supporting bracket, supporting a passive section of the reclining mechanism, which are located inward of external surfaces of a seat cushion or a seat back at positions spaced therefrom by predetermined distances. At least one of the brackets is provided with an impact absorbing section, which is caused to deform for absorbing impact energy imparted to a vehicle.

3 Claims, 6 Drawing Sheets

(56) References Cited

FOREIGN PATENT DOCUMENTS

| JP | 7-132767 A | 5/1995 |
| JP | 11-348628 A | 12/1999 |
| JP | 4000731 B2 | 8/2007 |
| JP | 2001-260723 A | 9/2011 |

* cited by examiner

FOLDING TYPE SEAT

FIELD OF THE INVENTION

The present invention relates to a folding type seat.

BACKGROUND OF THE INVENTION

In the related art, a seat has been adopted having a seat back provided with side portions onto which a pair of right and left side frames are provided, the side frames being provided with weakened portions, respectively (see, for instance, Japanese Patent No. 4000731). The weakened portions include inclined portions each bent in a triangular shape in cross section. When a load is imparted to the seat at a vehicle front or a vehicle rear, the inclined portions are caused to bent and deform thereby absorbing impact energy.

With the seat frame described in Japanese Patent No. 4000731, however, the inclined portions are located on the side frames at front ends thereof in the vicinity of a surface of the seat back. Accordingly, as a vehicle occupant sits on the seat, the inclined portions project toward the vehicle occupant, causing an issue of the vehicle occupant having a sense of incongruity with degradation in sitting comfort.

DISCLOSURE OF THE INVENTION

The present invention has been completed with the above issue in mind and has an object to provide a folding type seat that can keep excellent sitting comfort without causing any sense of incongruity when a vehicle occupant sits on the seat.

To address the above issue, the present invention provides a folding type seat comprising: a seat frame having a seat cushion frame mounted on a seat back frame to be pivotable on the seat cushion frame; a body supporting bracket fixed to the seat cushion frame and supporting a body section that forms a reclining mechanism; and a passive section supporting bracket fixed to the seat cushion frame and supporting a passive section that forms the reclining mechanism. The body supporting bracket and the passive section supporting bracket are located inward of external surfaces of the body supporting bracket and the passive section supporting bracket at positions spaced by a predetermined distance therefrom. At least one of the body supporting bracket and the passive section supporting bracket includes an impact absorbing section for absorbing impact energy imparted to the seat frame in a fore and aft direction of a vehicle.

With the folding type seat of the present invention, the body supporting bracket and the passive section supporting bracket are located inward of the external surfaces of the body supporting bracket and the passive section supporting bracket at the positions spaced by the predetermined distance therefrom. The body supporting bracket and/or the passive section supporting bracket include the impact absorbing section. Accordingly, when the vehicle occupant sits on the seat, no impact absorbing section gives a sense of incongruity to the vehicle occupant, thereby enabling excellent sitting comfort to be maintained. When the load is imparted to the seat, further, the impact absorbing section deforms at a position spaced from the vehicle occupant by a predetermined distance, thereby absorbing impact energy. This results in improvement in efficiency of absorbing impact energy.

BEST MODE FOR CARRYING OUT THE INVENTION

Now, concrete embodiments, to which the present invention is applied, will be described below in detail with reference to the drawings.

First Embodiment

Figure 1:
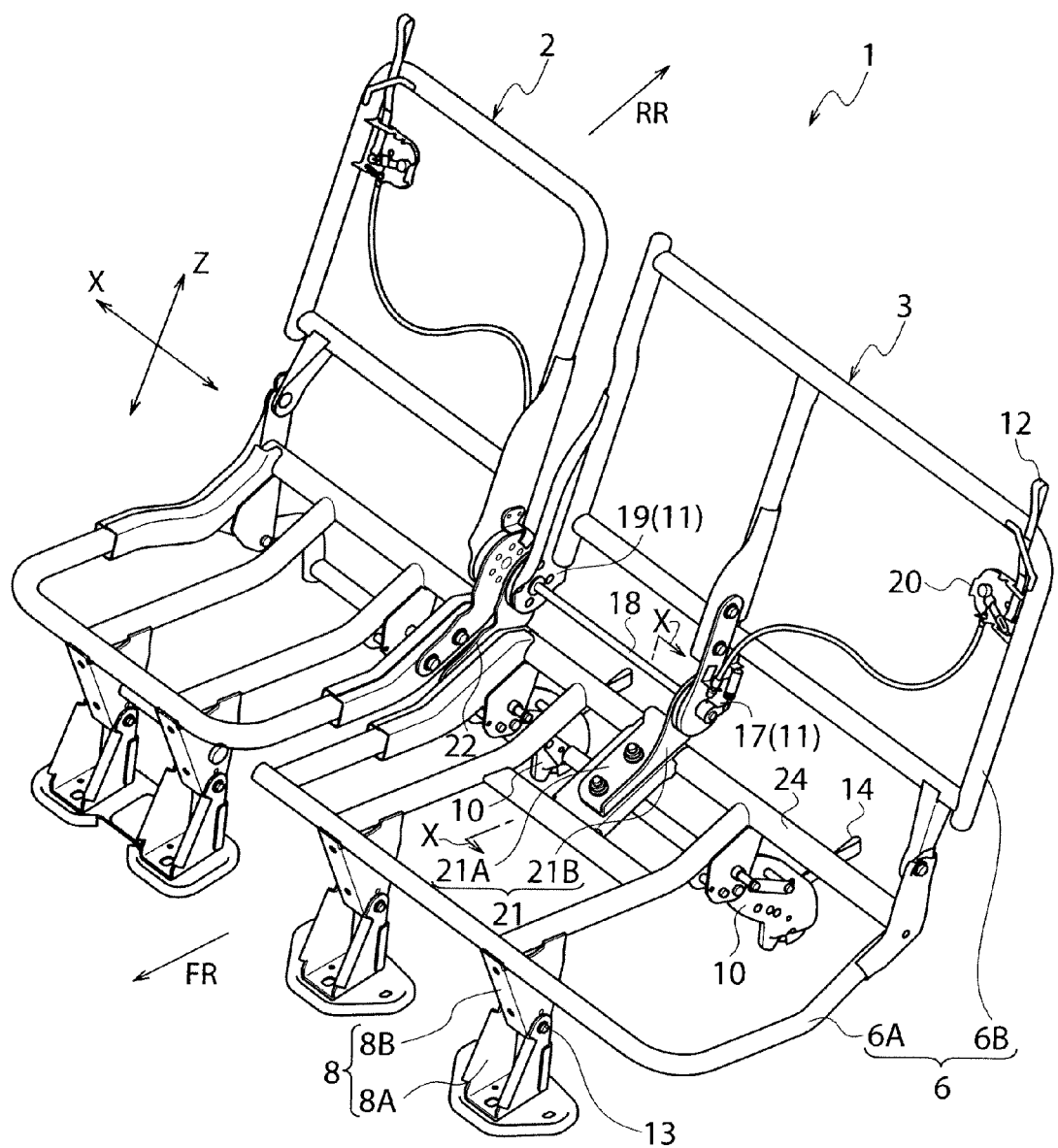
FIG. 1 is a perspective view of a seat frame forming a folding type seat of a first embodiment according to the present invention.
Figure 2:
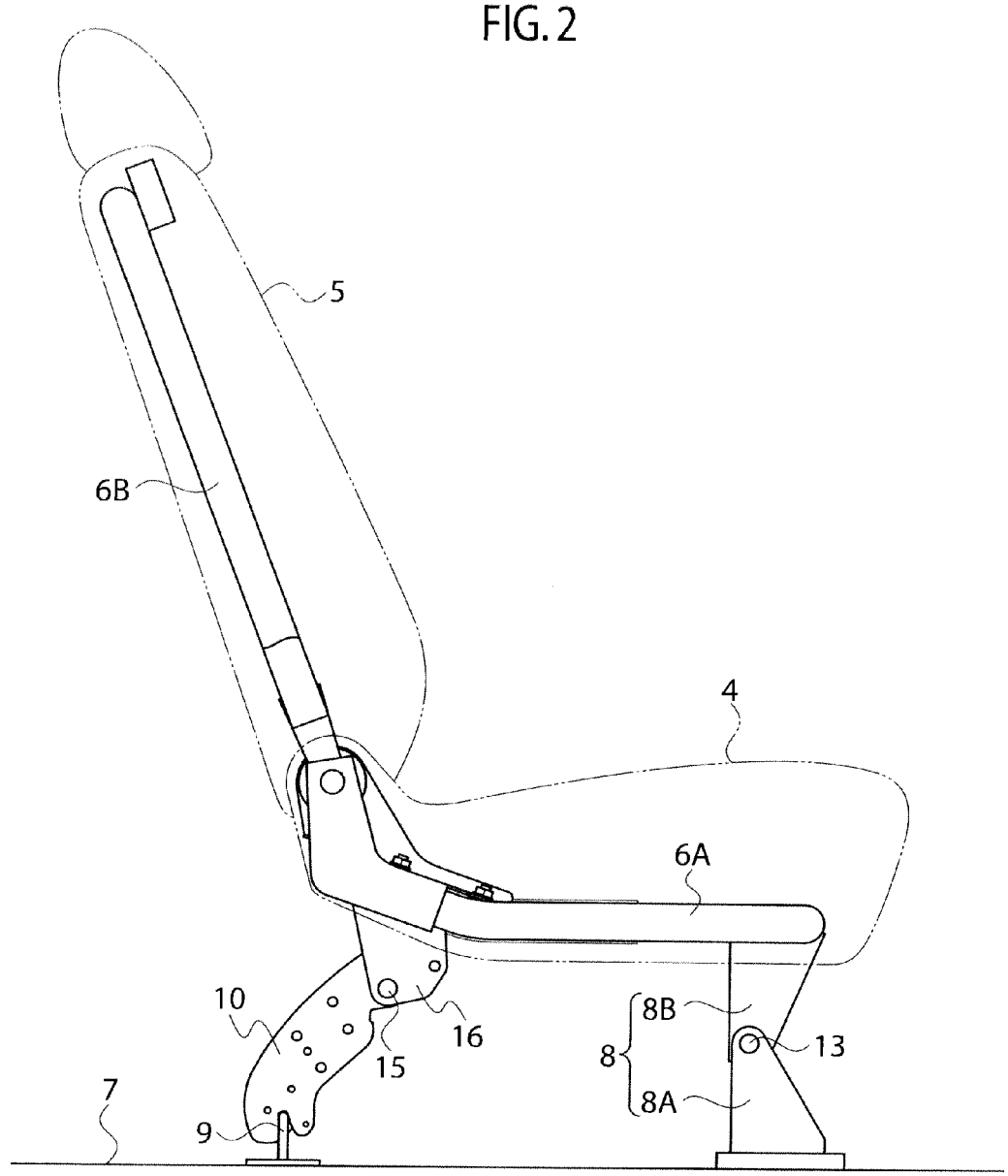
FIG. 2 is a side view of the folding type seat shown in FIG. 1.
Figure 3:
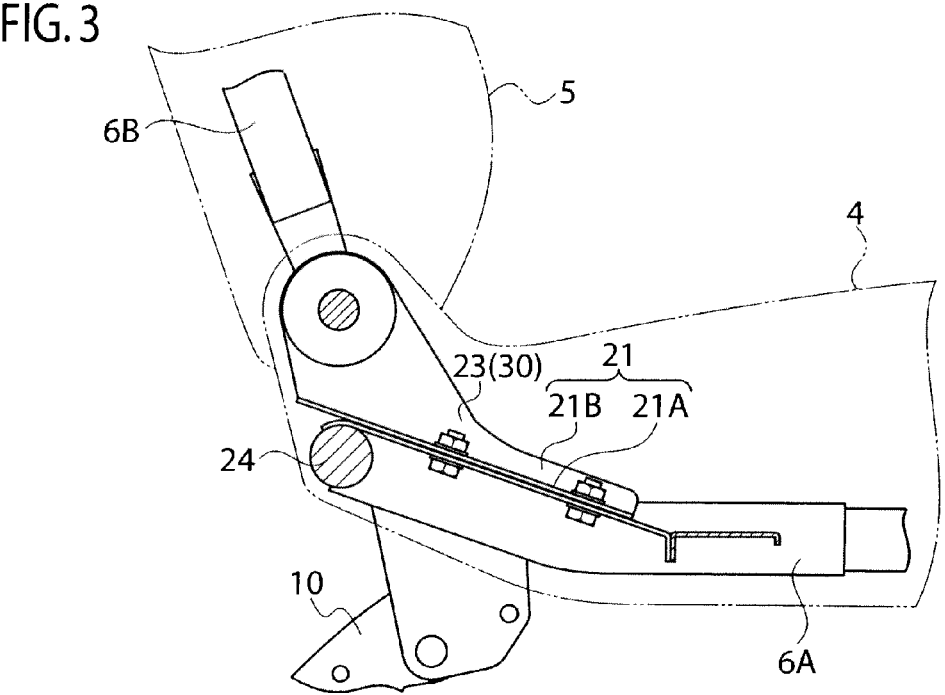
FIG. 3 is a cross-sectional view taken on line X-X of FIG. 1.
Figure 4:
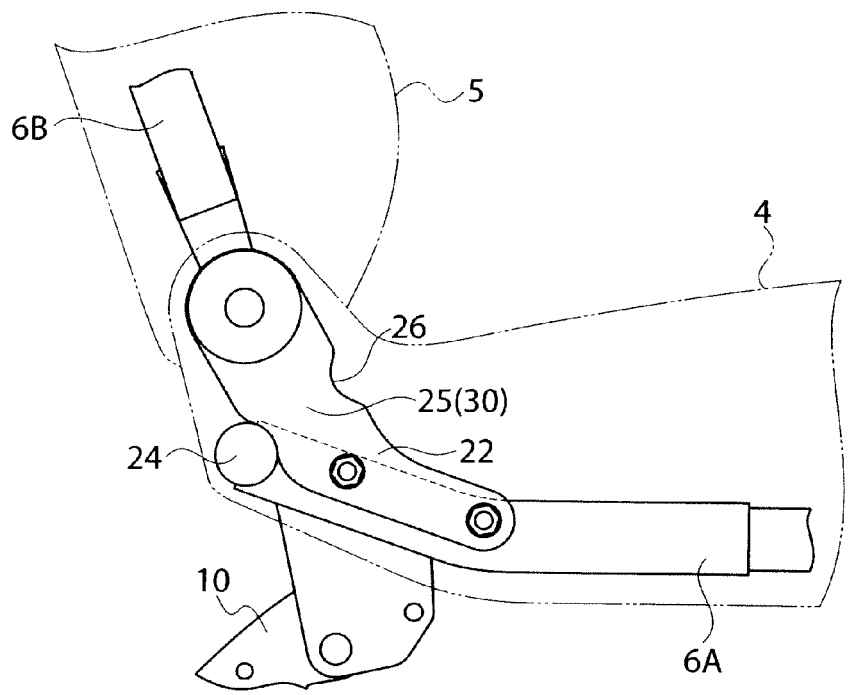
FIG. 4 is an enlarged side view of essential parts in an area mounted with a passive supporting bracket for supporting a passive section forming a reclining mechanism shown in FIG. 1.
Figure 5:
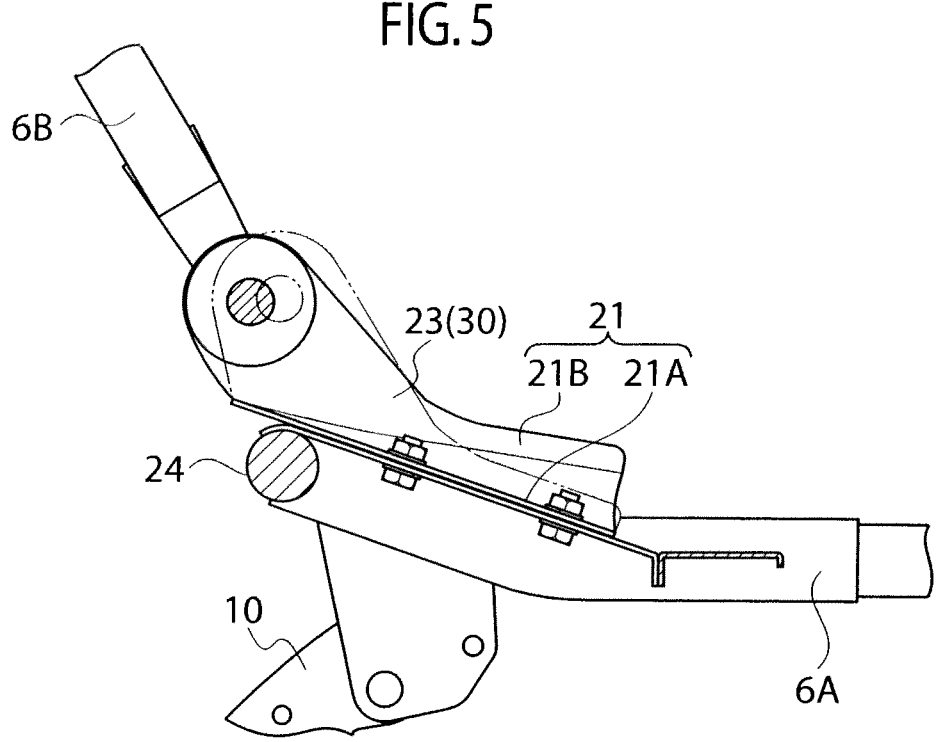
FIG. 5 is a cross-sectional view showing how a body supporting bracket is caused to deform rearward of a vehicle due to a load imparted to the seat frame at a front of the vehicle for thereby absorbing impact energy.
Figure 6:
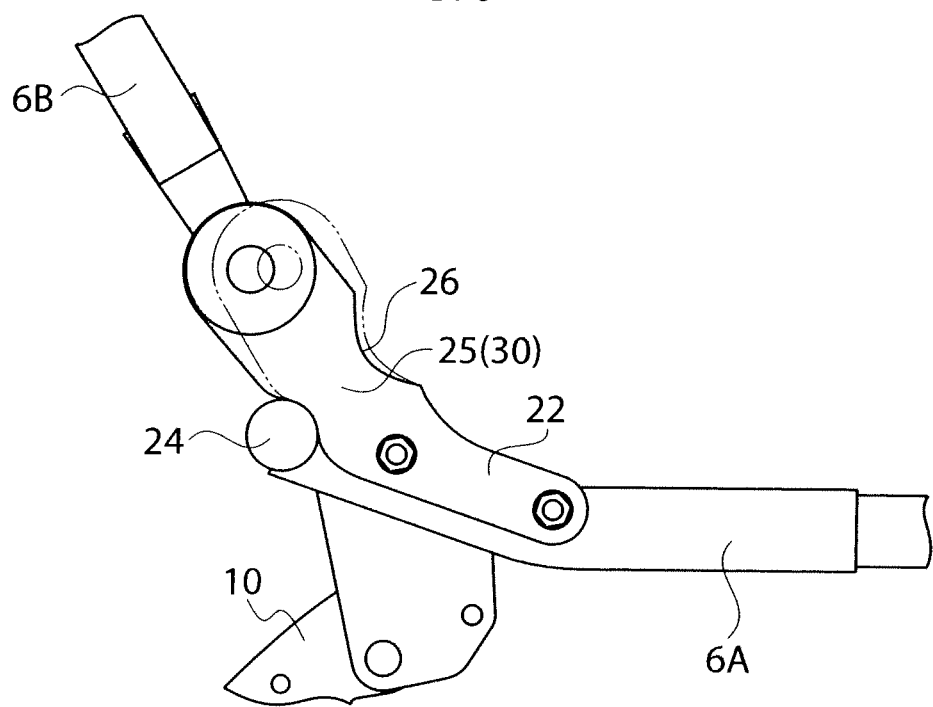
FIG. 6 is a cross-sectional view showing how the passive supporting bracket is caused to deform rearward of the vehicle due to the load imparted to the seat frame at the front of the vehicle for thereby absorbing impact energy.

FIG. 1 is a perspective view of a seat frame forming a folding type seat of a first embodiment; FIG. 2 is a side view of the folding type seat shown in FIG. 1; FIG. 3 is a cross-sectional view taken on line X-X of FIG. 1; FIG. 4 is an enlarged side view of essential parts in an area mounted with a passive supporting bracket for supporting a passive section forming a reclining mechanism shown in FIG. 1; FIG. 5 is a cross-sectional view showing how a body supporting bracket is caused to deform rearward of a vehicle due to a load applied to the seat frame at a front of the vehicle for thereby absorbing impact energy; FIG. 6 is a cross-sectional view showing how the passive supporting bracket is caused to deform rearward of the vehicle due to the load applied to the seat frame at the front of the vehicle for thereby absorbing impact energy.

Further, FIG. 1 shows only seat cushions and seat frames with seat backs being omitted for clarifying structures of the seat frames. In FIG. 1, furthermore, an arrow "FR" indicates a vehicle front; an arrow "RR" a vehicle rear; an arrow "X" a vehicle width direction; and an arrow "Z" a vehicle height.

The folding type seat 1 of the present embodiment includes a rear seat formed in a three seater configuration and takes a structure including a single-seater folding type seat 2 and a two-seater folding type seat 3. In the illustrated embodiment, both of these seats take the same structures and, hence, the present invention will be described with reference to the two-seater folding type seat 3 as one example.

As shown in FIGS. 1 and 2, the two-seater folding type seat 3 includes: a seat frame 6 on which a seat cushion 4 and a seat back 5 are mounted; front leg sections 8 pivotally mounted on the seat frame 6 at the front of the vehicle and fixedly secured to a vehicle floor 7; rear leg sections 10 pivotally mounted on the seat frame 6 at the rear of the vehicle and engageable with or disengageable from a striker 9 fixedly secured to the vehicle floor 7; and a reclining mechanism 11 allowing the seat back 5 to be foldable with respect to the seat cushion 4.

The seat frame 6 includes a seat cushion frame 6A composed of a plurality of steel pipes connected in combination and allowing the seat cushion 4 to be mounted thereon, and a seat back frame 6B on which the seat back 5 is mounted. The seat back frame 6B is structured to be pivotable (in folding capability) with respect to the seat cushion frame 6A in the fore and aft direction of the vehicle upon operating a strap 12 (see FIG. 1) protruding outside of an upper end of the seat back 5 connected to the reclining mechanism, described later.

The front leg sections 8 include floor-side legs 8A fixedly secured to the vehicle floor 7, and frame-side legs 8B fixedly secured to the seat cushion frame 6A to be pivotable about pivot shafts 13, respectively. The front leg sections 8 are spaced from each other with a predetermined distance in the vehicle width direction in a pair on right and left sides.

The rear leg sections 10 include locking devices (not shown) causing the rear leg sections 10 to be engageable with and disengageable from the striker 9 and are structured to disengage from the striker 9 when a strap belt 14 is pulled. The rear leg sections 10 have leading ends provided with fulcrum pivot shafts 15, respectively, which are pivotally mounted on brackets 16 of the seat cushion frame 6A. In the illustrated embodiment, the rear leg sections 10 are located at two positions spaced from each other with a predetermined distance in the vehicle width direction.

The reclining mechanism 11 includes a body section 17, mounted on the seat back frame 6B at a central area thereof in the vehicle width direction, and a passive section 19 mounted on the seat back frame 6B on a side thereof and interconnected to the body section 19 via a rod 18. An unlocking mechanism 20 is connected to the body section 17. The unlocking mechanism 20 is connected to the strap 12 for canceling a locked state of the seat back frame 6B with respect to the seat cushion frame 6A.

In the illustrated embodiment, the seat cushion frame 6A is provided with a body section supporting bracket 21, supporting the body section 17 of the reclining mechanism 11, and a passive section supporting bracket 22 supporting the passive section 19.

As shown in FIG. 1, the body section supporting bracket 21 is formed in a nearly L-shape configuration, when viewed from the front, with a fixed section 21A fixed on the seat cushion frame 6A by means of fastening means, such as bolts and nuts or the like, and a connecting section 21B vertically standing upright from the fixed section 21A. As shown in FIG. 3, the connecting section 21B is bent in a nearly L-shape as a whole when viewed from the side. In particular, the connecting section 21B has a rearward portion that is bent upward with respect to a forward portion at a boundary of the central portion in the fore and aft direction. When a load is imparted to the seat frame 6 in the fore and aft direction of the vehicle, the bend section 23 is caused to extend and deform in deployment in the fore and aft direction, enabling impact energy to be absorbed. In the illustrated embodiment, the bend section 23 of the body supporting bracket 21 plays a role as an impact absorbing section 30.

As shown in FIG. 3, further, the body section supporting bracket 21 is located inward (downward and rearward) of the external surfaces the seat cushion 4 and the seat back 5 at a position spaced therefrom by a predetermined distance. That is, the connecting section 21B of the body section supporting bracket 21 has a vehicular forward leading edge that is located at a position downward and rearward of the external surfaces of the seat cushion 4 and the seat back 5 to be spaced by a predetermined distance therefrom. Accordingly, when a vehicle occupant sits on the seat, no body section supporting bracket 21 causes the vehicle occupant to have a sense of incongruity due to the body section supporting bracket 21 located at a position distanced from the body of the vehicle occupant.

That is, the impact absorbing section 30 is arranged to cause the body section supporting bracket 21 to deform so as to fold rearward of the vehicle with a fulcrum at a main pipe 24, mounted on the seat cushion frame 6A at a rear end thereof and extending along the vehicle width direction, such that impact energy is absorbed. As shown in FIG. 5, more particularly, the bend section 23 of the body section supporting bracket 21 is caused to deform (particularly in plastic deformation) so as to extend in deployment toward the vehicle rear with the fulcrum at the main pipe 24, thereby absorbing impact energy. This causes the body section supporting bracket 21 not to deform in the vehicle width direction like the related art but to deform rearward of the vehicle.

As shown in FIGS. 1 and 4, the passive section supporting bracket 22 is fixedly secured to the sides of the seat cushion frame 6A by means of fastening means such as bolts and nuts or the like. The passive section supporting bracket 22 is formed in a nearly L-shaped flat-plate configuration, when viewed from the side, and fixedly secured to the sides of the seat cushion frame with a plate-thickness direction aligned in a mounting direction. Even with the passive section supporting bracket 22 formed in the L-shaped configuration, the bend section 25 is set to the impact absorbing section 30 that absorbs impact energy upon extending and deforming in deployment in the fore and aft direction of the vehicle due to the load imparted to the seat frame in the fore and aft direction of the vehicle. That is, when the load is imparted to the seat frame 6 in the fore and aft direction of the vehicle, the load is transferred to the passive section supporting bracket 22 formed in the L-shaped configuration. That is, the bend section 25 is so arranged as to extend and deform (particularly in plastic deformation) in deployment in the fore and aft direction of the vehicle such that impact energy is absorbed.

That is, the bend section 25, playing as a role as the impact absorbing section 30, allows the passive section supporting bracket 22 to fold deforming rearward of the vehicle with the fulcrum at the main pipe 24 provided on the seat cushion frame 6A at the rear of the vehicle to extend in the vehicle width direction, thereby absorbing impact energy. As shown in FIG. 6, more particularly, the bend section 25 of the passive section supporting bracket 22 is caused to extend rearward of the vehicle with the fulcrum at the main pipe 24 in response to the load imparted to the seat frame 6 at, for instance, the front of the vehicle, thereby absorbing impact energy. This causes the passive section supporting bracket 22, like the body section supporting bracket 21, not to deform in the vehicle width direction as experienced in the related art but to deform rearward of the vehicle.

As shown in FIG. 4, moreover, the passive section supporting bracket 22 is located at a position inward (downward and rearward) of the external surfaces of the seat cushion 4 and the seat back 5 to be spaced by a predetermined distance. That is, the passive section supporting bracket 22 is located at the position downward and rearward of the external surfaces of the seat cushion 4 and the seat back 5 to be spaced by the predetermined distance. Accordingly, under a situation where the vehicle occupant sits on the seat, the passive section supporting bracket 22 is placed apart from the body of the vehicle occupant and the vehicle occupant has no sense of incongruity resulting from the passive section supporting bracket 22.

Furthermore, the passive section supporting bracket 22 is formed with a cutout portion 26 for facilitating the deformation of the bend section 25 playing a role as the impact absorbing section 30. The cutout portion 26 is cut out in a circular arc shape toward the main pipe 24 when viewed from the side. Moreover, the cutout portion 26 may be formed in a position close proximity to the bend section 23 of the body section supporting bracket 21.

The bend sections 23 and 25, formed on the body section supporting bracket 21 and the passive section supporting bracket 22, respectively, are located between mount points between the respective brackets and the seat cushion frame 6A and mount points between the body section 17, forming the respective brackets and the reclining mechanism 11, and the passive section 19. That is, the bend section 23 is located between the mount point, at which the body section supporting bracket 21 is mounted on the seat cushion frame 6A, and the mount point at which the body section 17 is mounted onto the bracket. In addition, the bend section 25 is located between the mount point, at which the passive section supporting bracket 22 is mounted on the seat cushion frame 6A, and the mount point at which the passive section 19 is mounted on the bracket.

In the illustrated embodiment, further, the bend sections 23 and 25 of the respective brackets 21 and 22 may be set to lie at inclined angles such that the body section supporting bracket 21 and the passive section supporting bracket 22 bear the nearly same amounts of deformations.

Description will be made of a modified form of the seat frame 6 when the folding type seat of such a structure mentioned above is imparted with the load at the front of the vehicle.

When the load, oriented rearward of the vehicle, is imparted to the seat frame 6 at the front of the vehicle, the seat back frame 6B, made foldable with respect to the seat cushion frame 6A, is pulled rearward of the vehicle. The load, acting on the seat back frame 6B in the rear of the vehicle, acts on the body section supporting bracket 21 and the passive section supporting bracket 22.

The body section supporting bracket 21 allows the bend section 23 to extend in deformation from an initial state, indicated by a chain double-dashed line, so as to deploy rearward of the vehicle with the fulcrum at the main pipe 24 as indicated by a solid line shown in FIG. 5. If the external force is large, further, the connecting section 21B is caused to deform and lift upward with respect to the fixed section 21A of the body section supporting bracket 21.

With the passive section supporting bracket 22, meanwhile, the bend section 25 is caused to deform from an initial state, as shown by a two-dot chain line in FIG. 6, deploying rearward of the vehicle with a fulcrum on the main pipe 24 in response to an external force applied from the seat back frame 6B similarly pulled rearward of the vehicle as indicated by a solid line. In particular, with the passive section supporting bracket 22, the bend section 25 is formed with the cutout portion 26, which allows deformation to easily occur such that deformation is further enhanced thereby facilitating the bracket to deform rearward of the vehicle.

Thus, none of the body section supporting bracket 21 and the passive section supporting bracket 22 is caused to deform so as to protrude toward the vehicle occupant during a collision of the vehicle and these component parts are caused to deform rearward of the vehicle for thereby absorbing impact energy. Further, when the load is imparted from the rear of the vehicle to the seat frame 6 toward the front of the vehicle, the body section supporting bracket 21 and the passive section supporting bracket 22 cause the respective bend sections 23 and 25 to deform in response to an external force, pushing the seat back frame 6B in the vehicle front, such that impact energy is absorbed Description will be made of advantageous effects of the present embodiment.

First, the body section supporting bracket 21 and the passive section supporting bracket 22 are located inward (downward and rearward) of the external surfaces of the seat cushion 4 or the seat back 5 in positions spaced therefrom by a predetermined distance. During a normal mode, therefore, a space can be ensured between the vehicle occupant and the seat frame 6, enabling the vehicle occupant to enhance excellent sitting comfort and performance. When the load is imparted to the vehicle at the front or the rear thereof, further, the body section supporting bracket 21 and/or the passive section supporting bracket 22 are caused to deform at a position distanced from the vehicle occupant such that impact energy is absorbed, resulting in improved efficiency of absorbing impact energy. Here, the deformations of the brackets 21 and 22 are not limited to the deformations in the fore and aft direction of the vehicle but involve those occurring in a vehicle width direction.

Furthermore, the load imparted to the seat frame 6 at the front or the rear of the vehicle causes the bend sections 23 and 25 of the body section supporting bracket 21 and the passive section supporting bracket 22, supporting the body section 17 or the passive section 19 of the reclining mechanism 11, to deform in the fore and aft direction of the vehicle for thereby absorbing impact energy. Accordingly, none of the brackets 21 and 22 is caused to deform in protrusion toward the vehicle occupant and, hence, a space can be enhanced between the vehicle occupant and the seat frame 6 even when an impact load is imparted.

With the present embodiment, moreover, the load imparted on the seat frame 6 causes the bend sections 23 and 25 of the body section supporting bracket 21 and the passive section supporting bracket 22 to deform for absorbing impact energy. This enables energy to be absorbed with a simplified structure.

With the present embodiment, further, the bend section 25 of the passive section supporting bracket 22 is formed with the cutout portion 26 and the cutout portion 26 facilitates the deformation of the bend section 25.

With the present embodiment, furthermore, the bend sections 23 and 25 are provided between the mount position for the respective brackets 21 and 22 and the seat cushion 6A and the mount position for the respective brackets 21 and 22, the body section 17 and the passive section 19, thereby enabling the brackets to be miniaturized.

With the present embodiment, moreover, the passive section supporting bracket 22 is formed in the flat-plate configuration and fixed to the side of the seat cushion frame with the plate-thickness direction aligned in the mounting direction. Thus, even with the seat of the structure composed of the single-seater folding type seat 2 and the two-seater folding type seat 3 both of which are interconnected as shown in FIG. 1, the bracket 22 can be placed between adjacent seats and no need arises for wastefully widening a space between the seats 2 and 3.

Second Embodiment

Next, a second embodiment according to the present invention will be described below with the component parts having the same structures as those of the first embodiment bear like reference numerals to omit relevant description.

Figure 7:
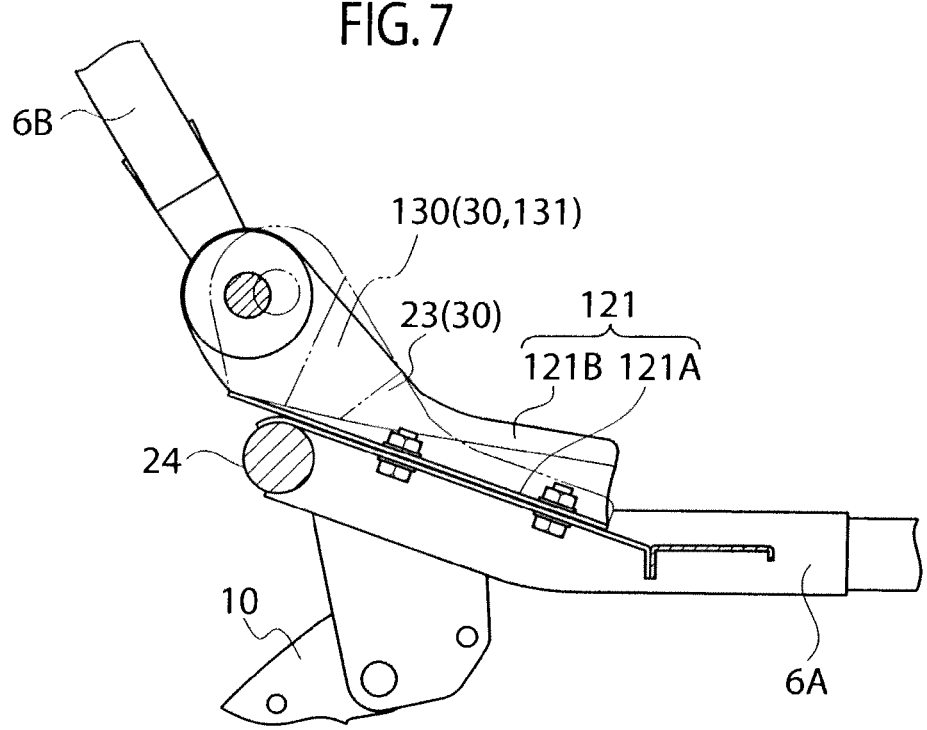
FIG. 7 is a cross-sectional view showing the body supporting bracket and its vicinity of a second embodiment and corresponds to FIG. 4 for the first embodiment.
Figure 8:
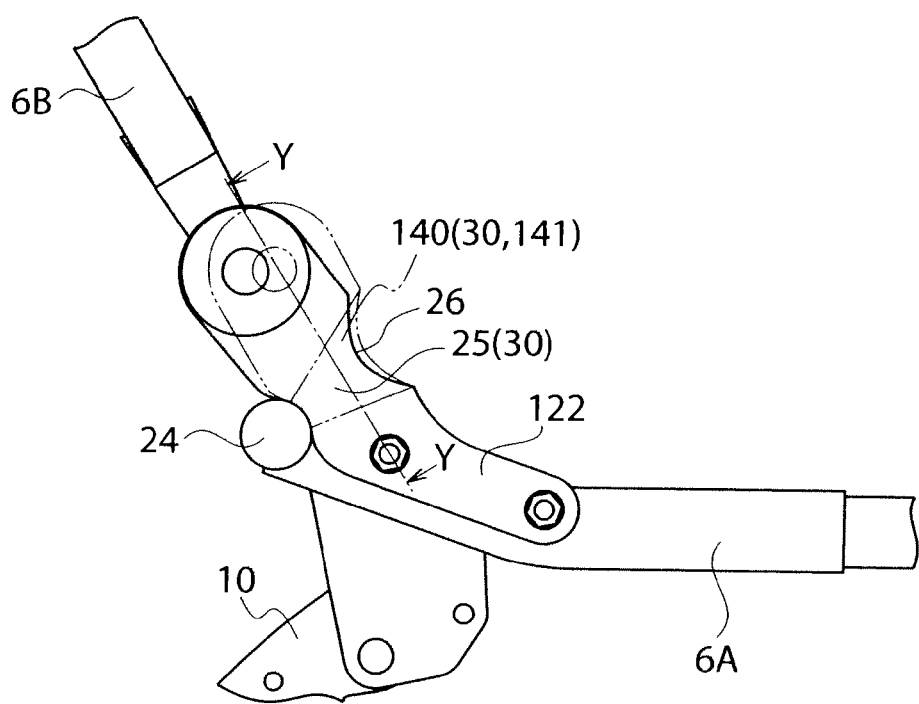
FIG. 8 is a cross-sectional view showing the passive supporting bracket and its vicinity of the second embodiment and corresponds to FIG. 4 for the first embodiment.
Figure 9:
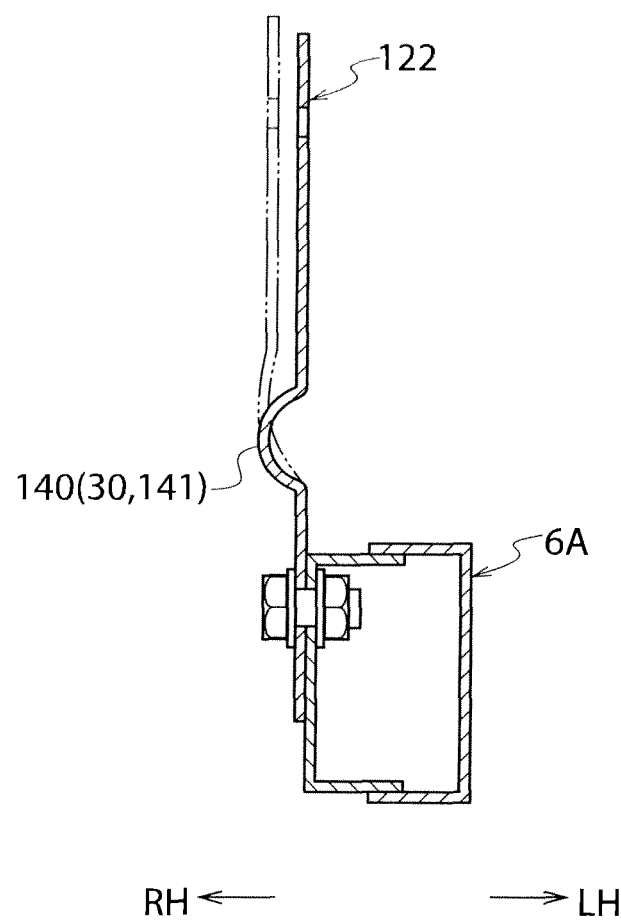
FIG. 9 is a cross-sectional view taken on line Y-Y of FIG. 8.

FIG. 7 is a cross-sectional view, showing a vicinity of a body section supporting bracket of the second embodiment, which corresponds to FIG. 3 related to the first embodiment. FIG. 8 is a side view, showing a vicinity of a passive section supporting bracket of the second embodiment, which corresponds to FIG. 4 related to the first embodiment. Further, FIG. 9 is a side view taken on line Y-Y of FIG. 8.

With the present embodiment, the body section supporting bracket 121 and the passive section supporting bracket 122 are provided with convexed sections 131 and 141 in the form of curved sections 130 and 140, which are set to be the impact absorbing section 30.

As shown in FIG. 7, more particularly, the body section supporting bracket 121 has a nearly L-shaped configuration formed with a fixed section 121A, fixedly secured to the seat cushion frame 6A by means of fastening means such as bolts and nuts, and a connecting section 121B vertically standing upright from the fixed section 121A. In addition, the curved section 130 is formed in the vicinity of the bend section 23 and protruding leftward of the vehicle.

As shown in FIG. 8, meanwhile, the passive section supporting bracket 122 is fixedly secured to the side of the seat cushion frame 6A by means of fastening means such as bolts and nuts. The passive section supporting bracket 122 is formed in a nearly L-shaped flat-plate configuration and fixedly secured to the side of the seat cushion frame 6A by means of fastening means such as bolts and nuts with a plate-thickness direction aligned on the mounting direction. Moreover, the bend section 25 has a curved section 140 formed of a convexed section 141 protruding rightward of the vehicle in the vicinity of the bend section 25.

That is, as shown by a solid line in FIG. 9, the curve section 140 is formed on the passive section supporting bracket 122 in an area close proximity to the bend section 25 and has a circular arc shape in cross section to play a role as the convexed portion 141 protruding rightward of the vehicle. The curved section 140 protrudes rightward of the vehicle toward the outside thereof in the width, direction of the seat and, as will be apparent from FIG. 1, has the convexed shape formed in a direction distanced from the vehicle occupant sitting on the seat. Accordingly, when a load is applied to the seat back frame 6B in a direction toward the rear of the vehicle, the curved section 140 (convexed portion 141) longitudinally extends in a flat shape to move in deformation in the vehicle width direction as shown in FIG. 9. This causes the passive section supporting bracket 122 to deform from a shape, indicated by a solid line, to a shape indicated by a two-dot chain line. In addition, the convexed section 131 and the curved section 130 have the same cross-sectional shapes as those of the convexed section and the curved section 140 shown in FIG. 9. Moreover, as shown by two-dot chain lines in FIGS. 7 and 8, the curved section 130 (convexed section 131) and the curved section 140 (convexed section 141) extend in a way to expand forward and obliquely upward at an axis center of the main pipe 24.

Description will be made of advantageous effects of the present embodiment.

First, the body section supporting bracket 121 and the passive section supporting bracket 122 are located inward (downward and rearward) from the external surfaces of the seat cushion 4 and the seat back 5 at positions spaced by a predetermined distance. During a normal mode, therefore, a space can be ensured between the vehicle occupant and the seat frame 6. Thus, the body section supporting bracket 121 and the passive section supporting bracket 122 allow the vehicle occupant to have excellent sitting comfort with no sense of incongruity.

Further, when the load is applied to the vehicle at the front or the rear thereof, the body section supporting bracket 121 and/or the passive section supporting bracket 122 are caused to deform absorbing impact energy at a position spaced from the vehicle occupant, resulting in improved efficiency of absorbing impact energy.

With the present embodiment, in particular, the body section supporting bracket 121 and the passive section supporting bracket 122 are provided with the convexed portions 131 and 141, formed in the convexed shapes when viewed from the front, which are set to be the impact absorbing member 30. Therefore, when the load is applied to the seat back frame 6B in the fore and aft direction of the vehicle, the convexed portions 131 and 141 (curved portions 130 and 140) extend to deform in the flat shape and in the vehicle width direction, thereby enabling impact energy to be efficiently absorbed. Thus, the convexed portions 131 and 141, each having a margin of extension, allows the convexed portions 131 and 141 to extend in deformation, enabling impact energy to be absorbed at further increased efficiency.

With the present embodiment, further, the convexed portions 131 and 141 are formed in the curved sections 130 and 140 in circular arc cross sections. When the load is applied to the seat back frame 6B in the fore and aft direction of the vehicle, therefore, the curved sections 130 and 140 extend in deformation, thereby enabling impact energy to be absorbed at extremely high efficiency.

Moreover, it is intended that the embodiments described be considered only as illustrative of the invention and that the present invention is not limited to such embodiments.

What is claimed is:

1. A folding type seat comprising:
    a seat frame composed of a seat cushion frame and a seat back frame;
    a reclining mechanism including a body section and a passive section connected to the body section;
    a body supporting bracket supporting the body section, and including an end portion attached to the body section and a base portion fixed to the seat cushion frame; and
    a passive section supporting bracket supporting the passive section, and including an end portion attached to the passive section and a base portion fixed to the seat cushion frame;
    the body supporting bracket and the passive section supporting bracket being located inward of external surfaces of a seat cushion or a seat back at positions spaced by predetermined distances; and
    at least one of the body supporting bracket and the passive section supporting bracket including an impact absorbing section for absorbing impact energy imparted to the seat frame in a fore and aft direction of a vehicle, the impact absorbing section being located between the end portion and the base portion of the at least one of the body supporting bracket and the passive section supporting bracket, wherein:
    the impact absorbing section includes a bend section provided on the at least one of the body supporting bracket and the passive section supporting bracket and curved in a nearly L-shape configuration when viewed from the side;
    wherein the bend section is caused to deform in a way to extend in deployment in the fore and aft direction of the vehicle such that a distance between the end portion and the base portion increases in response to a load imparted to the seat frame in the fore and aft direction of the vehicle; and wherein the impact absorbing section includes a convex section provided on the at least one of the body supporting bracket and the passive section supporting bracket, and the convex section includes a curved section curved in a nearly circular arc configuration in a cross section perpendicular to the fore and aft direction of the vehicle, and wherein the convex section includes a cutout section cut out in a circular arc shape when viewed from the side.

2. The folding type seat according to claim 1, wherein:
the impact absorbing section of the body support bracket is provided between a mount point at which the body supporting bracket is mounted on the seat cushion frame and a mount point at which the body section is mounted on the body supporting bracket, and the impact absorbing section of the passive section supporting bracket is provided between a mount point at which the passive section supporting bracket is mounted on the seat cushion frame and a mount point at which the passive section is mounted on the passive section supporting bracket.

3. The folding type seat according to claim 1, wherein:
the passive section supporting bracket has a fiat-plate shape and is fixed to a side of the seat cushion frame with a plate-thickness direction aligned on a mount direction.

\* \* \* \* \*